(12) United States Patent
Min et al.

(10) Patent No.: US 12,452,848 B2
(45) Date of Patent: Oct. 21, 2025

(54) BASE STATION AND COMMUNICATION METHOD

(71) Applicant: NTT DOCOMO, INC., Tokyo (JP)

(72) Inventors: Tianyang Min, Tokyo (JP); Yuya Hoshizaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 18/260,690

(22) PCT Filed: Jan. 13, 2021

(86) PCT No.: PCT/JP2021/000935
§ 371 (c)(1),
(2) Date: Jul. 7, 2023

(87) PCT Pub. No.: WO2022/153423
PCT Pub. Date: Jul. 21, 2022

(65) Prior Publication Data
US 2024/0064719 A1    Feb. 22, 2024

(51) Int. Cl.
*H04W 72/0453* (2023.01)
*H04W 16/10* (2009.01)
*H04W 88/08* (2009.01)

(52) U.S. Cl.
CPC ....... *H04W 72/0453* (2013.01); *H04W 16/10* (2013.01); *H04W 88/08* (2013.01)

(58) Field of Classification Search
CPC . H04W 72/0453; H04W 16/10; H04W 88/08; H04W 8/24; H04W 72/27; H04W 72/51; H04W 76/15
See application file for complete search history.

(56) References Cited

U.S. PATENT DOCUMENTS 10,728,742 B2 * 7/2020 Van Der Velde ....... H04W 8/22
2017/0201934 A1 * 7/2017 Kim ...................... H04W 48/18
(Continued)

FOREIGN PATENT DOCUMENTS

CN        110267301 A  *  9/2019  ........ H04W 36/0011
WO  WO-2020090069 A1 *  5/2020  ............ H04W 72/51

OTHER PUBLICATIONS

3GPP TS 38.300 V16.4.0; "3rd Generation Partnership Project; Technical Specification Group Radio Access Network; NR; NR and NG-RAN Overall Description; Stage 2 (Release 16)"; Dec. 2020 (149 pages).

(Continued)

*Primary Examiner* — Robert J Hance
(74) *Attorney, Agent, or Firm* — Osha Bergman Watanabe & Burton LLP

(57) ABSTRACT

A base station includes a reception unit configured to receive, from a terminal, information indicating band combinations supported by the terminal; a control unit configured to generate first information indicating all band combinations including a supported band of a primary cell among the band combinations supported by the terminal; and a transmission unit configured to transmit the first information to a secondary node. The reception unit is configured to receive, from the secondary node, second information indicating a band combination used by the secondary node among the all band combinations, and the transmission unit is configured to transmit the second information to the terminal.

3 Claims, 9 Drawing Sheets

(56) References Cited

U.S. PATENT DOCUMENTS

2020/0314932 A1* 10/2020 Jin .......................... H04W 8/24
2020/0367085 A1* 11/2020 Hong ................... H04W 12/50
2021/0226750 A1* 7/2021 Cheng .................. H04W 72/23
2024/0064786 A1* 2/2024 Jin ....................... H04W 76/15

OTHER PUBLICATIONS

3GPP TS 37.340 V16.4.0; "3rd Generation Partnership Project; Technical Specification Group Radio Access Network; Evolved Universal Terrestrial Radio Access (E-UTRA) and NR; Multi-connectivity; Stage 2 (Release 16)"; Dec. 2020 (84 pages).
International Search Report issued in corresponding International Application No. PCT/JP2021/000935, mailed on Jul. 20, 2021 (3 pages).
Written Opinion issued in corresponding International Application No. PCT/JP2021/000935, mailed on Jul. 20, 2021 (3 pages).

* cited by examiner

FIG.3 allowedBC-ListMRDC
A list of indices referring to band combinations in MR-DC capabilities from which SN is allowed to select the SCG band combination. Each entry refers to:
- a band combination numbered according to *supportedBandCombinationList* and *supportedBandCombinationList-UplinkTxSwitch* in the *UE-MRDC-Capability* (in case of (NG)EN-DC), or according to *supportedBandCombinationList* and *supportedBandCombinationListNEDC-Only* in the *UE-MRDC-Capability* (in case of NE-DC), or according to *supportedBandCombinationList* in the *UE-NR-Capability* (in case of NR-DC),
- and the Feature Sets allowed for each band entry. All MR-DC band combinations indicated by this field comprise the MCG band combination, which is a superset of the MCG band(s) selected by MN.
The MN may increase the probability that the SN finds a suitable SCG configuration by including in this field all entries that comprise at least the PCell band of MN.

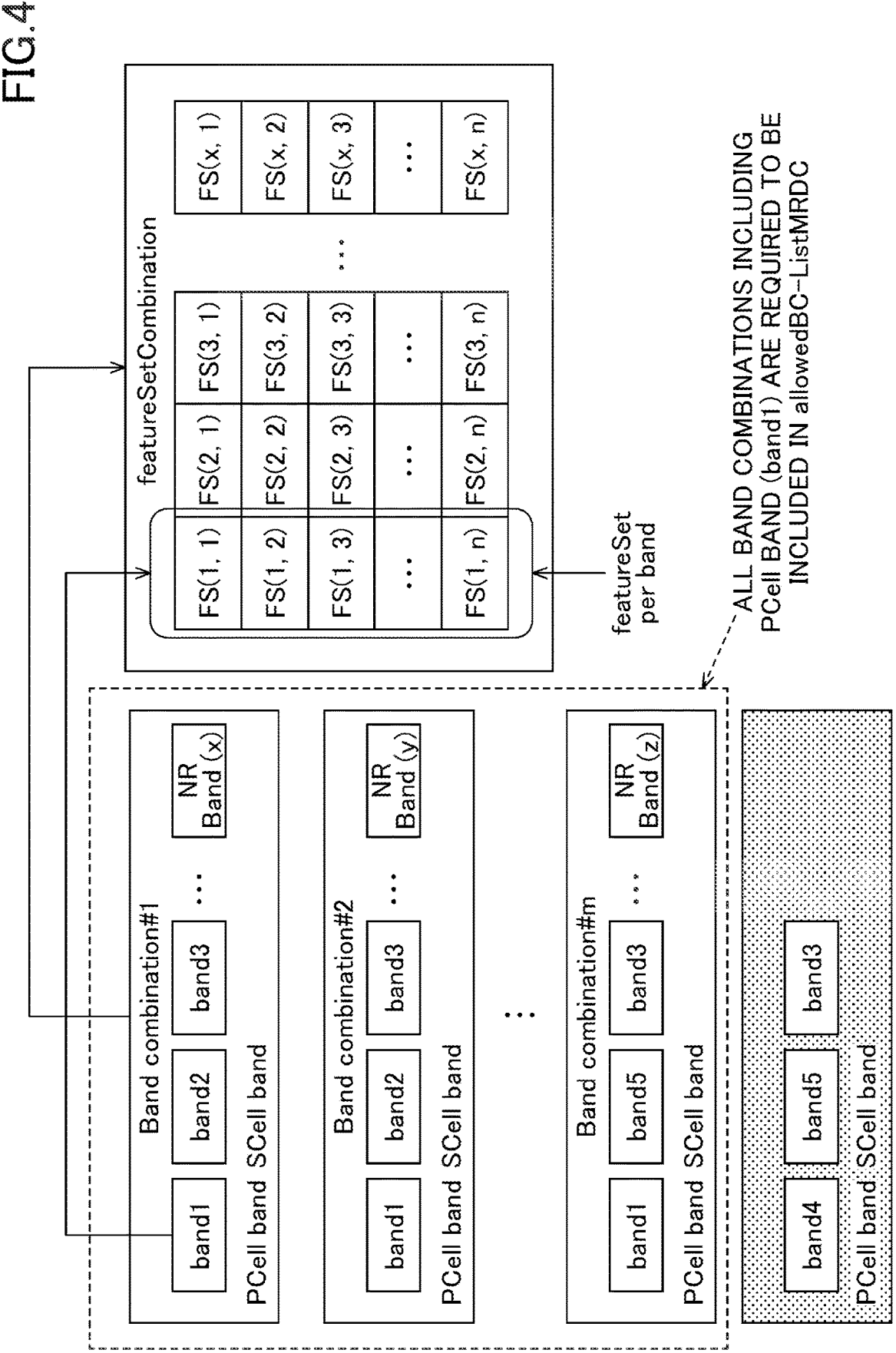

BASE STATION AND COMMUNICATION METHOD

TECHNICAL FIELD

The present invention relates to a base station and a communication method in a wireless communication system.

BACKGROUND ART

In the 3rd Generation Partnership Project (3GPP), a wireless communication scheme (hereinafter referred to as "NR") called 5G or New Radio (NR) has been discussed in order to achieve further increase in the system volume, further increase in the data transmission rate, further reduction in delay in the wireless section, and the like. With regard to 5G, various wireless technologies and network architectures have been discussed in order to satisfy requirements including the delay in a wireless section being equal to or less than 10 Gbps while achieving a throughput equal to or higher than 1 ms (for example, see Non-Patent Document 1).

With regard to NR, multi radio dual connectivity (MR-DC) is supported (for example, see Non-Patent Document 2). With regard to MR-DC, a master node (MN) indicates, to a secondary node (SN), band combinations allowable in dual connectivity, and the SN selects a band combination to perform communication.

PRIOR ART DOCUMENT

Non-Patent Document

[Non-Patent Document 1] 3GPP TS 38.300 V16. 4.0 (2020-12)

[Non-Patent Document 2] 3GPP TS 37.340 V16. 4.0 (2020-12)

SUMMARY OF THE INVENTION

Problem to be Solved by the Invention

In EN-DC, which is one type of MR-DC, when a MN indicates, to a SN, band combinations allowable in dual connectivity, the SN may be unable to select a NR frequency bandwidth (channel band width: CBW) that is supported by the SN, resulting in EN-DC configuration failure.

The present invention has been made in view of such a situation, and an object of the present invention is to reduce a probability of a band combination configuration failure, at the time of dual connectivity.

Means for Solving the Problem

According to an embodiment of the present disclosure, there is provided a base station including: a reception unit configured to receive, from a terminal, information indicating band combinations supported by the terminal; a control unit configured to generate first information indicating all band combinations, including a supported band of a primary cell, among the band combinations supported by the terminal; and a transmission unit configured to transmit the first information to a secondary node. The reception unit is configured to receive, from the secondary node, second information indicating a band combination used by the secondary node among the all band combinations, and the transmission unit is configured to transmit the second information to the terminal.

Effects of the Invention

According to the disclosed technique, there is provided a technique capable of reducing a probability of a band combination configuration failure at the time of dual connectivity.

BRIEF DESCRIPTION OF DRAWINGS

FIG. 3 is an example of a specification change in the embodiment of the present invention.

FIG. 4 is a drawing illustrating an example of configuring band combinations according to the embodiment of the present invention.

MODE FOR CARRYING OUT THE INVENTION

Hereinafter, the embodiment of the present invention will be described with reference to the drawings. It should be noted that the embodiments described below are merely examples, and embodiments to which the present invention is applied are not limited to the following embodiment.

In operations of a wireless communication system according to the embodiment of the present invention, an existing technique is appropriately used. However, the existing technology is, for example, the existing LTE, but is not limited to the existing LTE. The term "LTE" used in the present specification has a broad meaning to also mean LIE-Advanced and schemes after LIE-Advanced (for example, NR) unless otherwise specified.

In addition, in the embodiment of the present invention described below, terms used in legacy LTE such as synchronization signal (SS), primary SS (PSS), secondary SS (SSS), physical broadcast channel (PBCH), physical random access channel (PRACH), physical downlink control channel (PDCCH), physical downlink shared channel (PDSCH), physical uplink control channel (PUCCH), physical uplink shared channel (PUSCH), and the like are used. This is for convenience of explanation, and signals, functions, and the like similar to these may be referred to by other names. Also, the above terms with respect to NR correspond to NR-SS, NR-PSS, NR-SSS, NR-PBCH, NR-PRACH, etc. However, even a signal used for NR is not necessarily specified as "NR-".

Further, in the embodiment of the present invention, the duplex scheme may be a time division duplex (TDD) scheme, a frequency division duplex (FDD) scheme, or another scheme (for example, a flexible duplex scheme).

In addition, in the embodiment of the present invention, "configuring" a radio parameter or the like may mean pre-configuring a predetermined value or configuring a radio parameter indicated by a base station 10 or a terminal 20.

Figure 1:
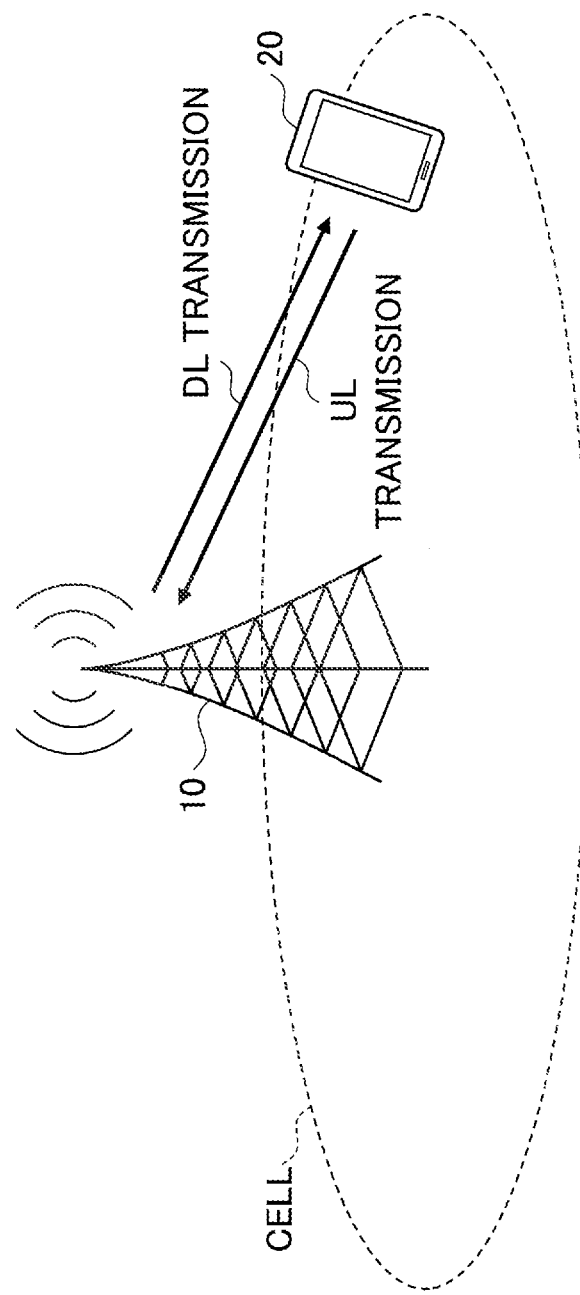
FIG. 1 is a drawing illustrating a wireless communication system according to an embodiment of the present invention.

FIG. 1 is a drawing illustrating a wireless communication system according to the embodiment of the present invention. As illustrated in FIG. 1, the radio communication system according to the embodiment of the present invention includes the base station 10 and the terminal 20. Although the single base station 10 and the single terminal 20 are illustrated in FIG. 1, this is merely an example, and a plurality of base stations 10 and a plurality of terminals 20 may be provided.

The base station 10 is a communication device that provides one or more cells and performs wireless communication with the terminal 20. A physical resource of a radio signal is defined with respect to time domain and with respect to frequency domain, and the time domain is defined by the number of orthogonal frequency division multiplexing (OFDM) symbols; and the frequency domain may be defined by the number of subcarriers or the number of resource blocks. In addition, a transmission time interval (TTI) with respect to the time domain may be a slot or a sub-slot; or the TTI may be a subframe.

The base station 10 is capable of performing carrier aggregation in which a plurality of cells (a plurality of component carriers (CCs)) are aggregated to perform communication with the terminal 20. In carrier aggregation, one primary cell (PCell) and one or more secondary cells (SCells) are used.

The base station 10 transmits a synchronization signal, system information, and the like to the terminal 20. The synchronization signal includes, for example, a NR-PSS and a NR-SSS. The system information is transmitted through, for example, a NR-PBCH or a PDSCH, and is also referred to as broadcast information. As illustrated in FIG. 1, the base station 10 transmits a control signal or data to the terminal 20 through a downlink (DL), and receives a control signal or data from the terminal 20 through an uplink (UL). Here, what is transmitted through a control channel such as a PUCCH or a PDCCH is referred to as a control signal, and what is transmitted through a shared channel such as a PUSCH or a PDSCH is referred to as data. However, such a way of naming is merely an example.

The terminal 20 is a communication device having a wireless communication function such as a smartphone, a mobile phone, a tablet, a wearable terminal, or a machine-to-machine (M2M) communication module. As illustrated in FIG. 1, the terminal 20 uses various communication services provided by the radio communication system by receiving a control signal or data from the base station 10 through the DL and transmitting a control signal or data to the base station 10 through the UL. Note that the terminal 20 may be referred to as a UE and the base station 10 may be referred to as a gNB.

The terminal 20 is capable of performing carrier aggregation in which a plurality of cells (a plurality of CCs) are aggregated for performing communication with the base station 10. In carrier aggregation, one primary cell and one or more secondary cells are used. Also, a PUCCH-SCell using a PUCCH may be used.

Figure 2:
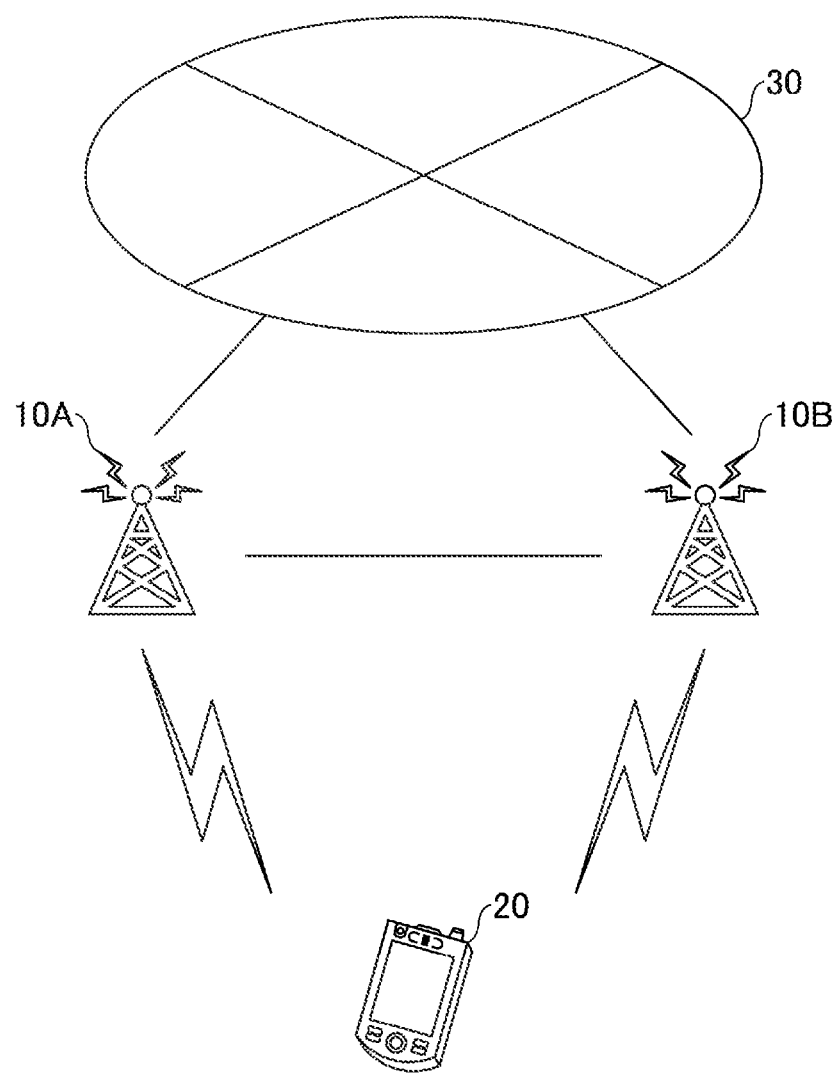
FIG. 2 is a drawing illustrating the wireless communication system according to the embodiment of the present invention.

FIG. 2 is a configuration example of the radio communication system in a case where dual connectivity (DC) is performed. As illustrated in FIG. 2, a base station 10A serving as master node (MN) and a base station 10B serving as a secondary node (SN) are provided. The base stations 10A and 10B are each connected to a core network 30. The terminal 20 can communicate with both the base stations 10A and 10B.

A cell group provided by the base station 10A that is the MN is referred to as a master cell group (MCG), and a cell group provided by the base station 10B that is the SN is referred to as a secondary cell group (SCG). At a time of DC, the MCG includes one PCell and one or more SCells, and the SCG includes one primary SCG cell (PSCell) and one or more SCells.

Processing operations in the present embodiment may be executed by the system configuration illustrated in FIG. 1, may be executed by the system configuration illustrated in FIG. 2, or may be executed by a system configuration other than these.

For example, when E-UTRA NR-DC (EN-DC) is initiated, the MN sends an information element allowedBC-ListMRDC to the SN, which is a list of allowed band combinations. The MN creates the allowedBC-ListMRDC from band combinations supported by the terminal 20 and reported by the terminal 20.

When the MN creates allowedBC-ListMRDC, the allowedBC-ListMRDC is required to include band combinations that are limited to those supported by the MN itself. Therefore, a case is assumed where, depending on a method of the limiting, the SN may be unable to select a channel bandwidth (CBW) of NR frequencies supported by the SN and the EN-DC configuration may fail (EN-DC configuration failure).

Therefore, when creating allowedBC-ListMRDC, the MN may include band combinations including all PCell bands supported by the MN in the allowedBC-ListMRDC.

FIG. 3 is an example of specification change in the embodiment of the present invention. As illustrated in FIG. 3, an allowedBC-ListMRDC is a list of indices referring to band combinations with respect to the MR-DC capability, and the SN is allowed to select a the SCG band combination from the list.

The band combinations that are configured in the list are numbered based on supportedBandCombinationList reported by the terminal 20. In addition, for example, in EN-DC, the numbering may be performed based on supportedBandCombinationList-UplinkTxSwitch included in UE-MRDC-Capability reported by the terminal 20.

With respect to each band combination that is configured in the list, featureSets are configured which are parameter groups allowed for the band combination.

In addition, all the MR-DC band combinations that are configured in the list include the MCG band combination that is a superset of the MCG bands selected by the MN.

When creating allowedBC-ListMRDC, the MN may include band combinations that at least include all of the bands of PCell supported by the MN in the allowedBC-ListMRDC.

Note that the allowedBC-ListMRDC is not required to be generated by limiting the band combination list reported by the user equipment 20 to the SCell band supported by the MN, or to the PCell and SCell band combinations.

It should be noted that the MN is not required to create the allowedBC-ListMRDC by limiting the featureSetCombination from a viewpoint of featureSet in each band combination in the band combination list reported by the terminal 20; or, the MN is not required to create the allowedBC-ListMRDC by performing the limitation from a viewpoint of a featureSet in featureSets for each band corresponding to each band in each band combination.

FIG. 4 is a drawing illustrating an example of configuring band combinations according to the embodiment of the present invention. AllowedBC-ListMRDC is created as illustrated in FIG. 4. The MN may include, in allowedBC-ListMRDC, all band combinations including the PCell band, band1, i.e., band combinations from BandCombination #1 to BandCombination #m as illustrated in FIG. 4.

Note that the band combination including band4 illustrated in FIG. 4 is a band combination that is not supported by the MN. The band2 illustrated in FIG. 4 is an SCell band.

In addition, as illustrated in FIG. 4, the MN may indicate n sets of featureSetCombination corresponding to one BandCombination. For example, the featureSet per band corresponding to band1 includes FS (1, 1) to FS (1, n). As described above, the MN is not required to create allowedBC-ListMRDC by limiting the featureSetCombination from the viewpoint of featureSet.

Figure 5:
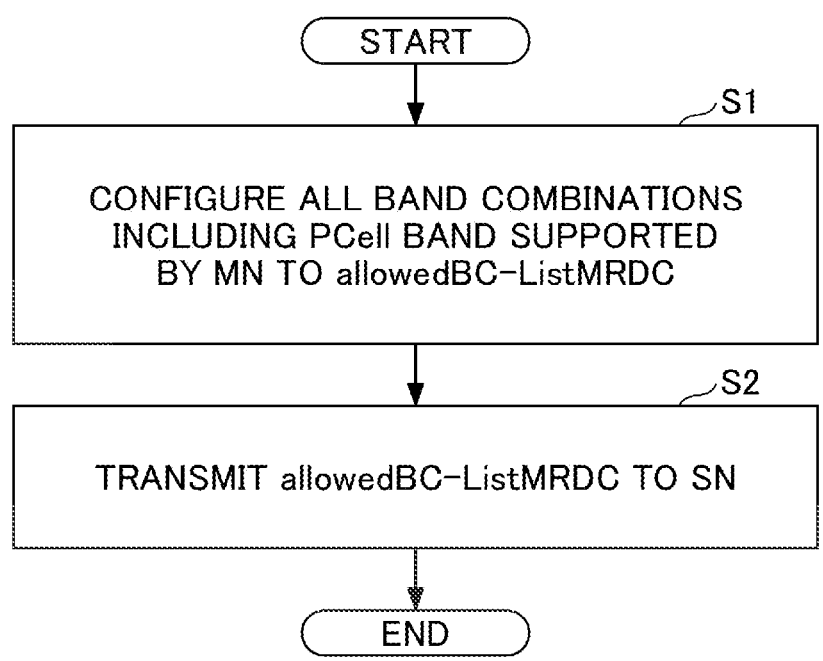
FIG. 5 is a flowchart illustrating the example of configuring band combinations according to the embodiment of the present invention.

FIG. 5 is a flowchart illustrating an example of configuring band combinations according to the embodiment of the present invention. In step S1, the MN configures all band combinations including the PCell band supported by the MN in allowedBC-ListMRDC. In subsequent step S2, the MN transmits the allowedBC-ListMRDC to the SN. Note that the MN may receive information indicating band combinations supported by the terminal 20 from the terminal 20 before step S1.

Figure 6:
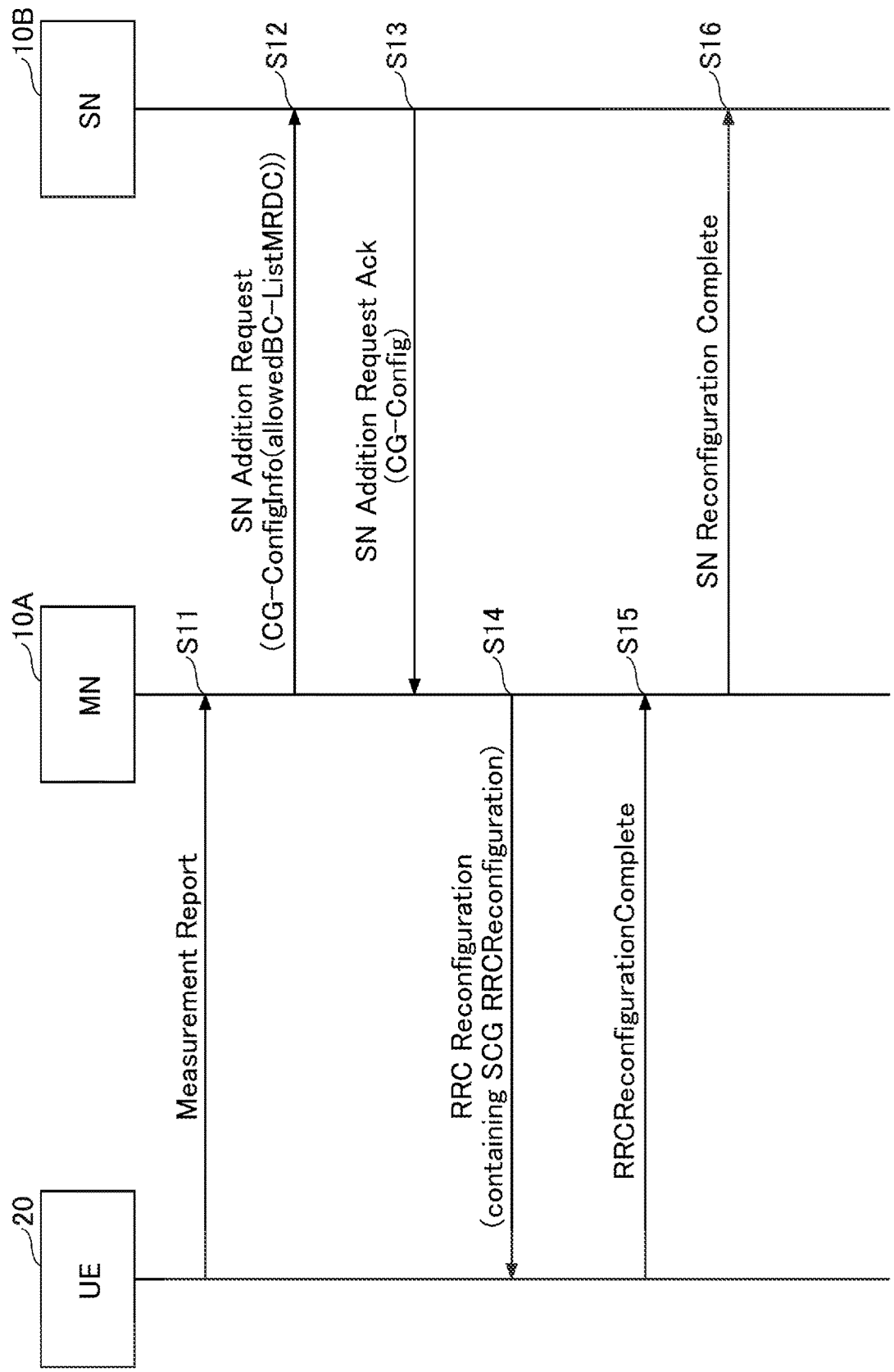
FIG. 6 is a sequence diagram illustrating a first example of configuring band combinations according to the embodiment of the present invention.

FIG. 6 is a sequence diagram illustrating a first example of setting band combinations according to the embodiment of the present invention. In step S11, the UE 20 transmits MeasurementReport which is a report of a measurement result to the MN 10A. In subsequent step S12, the MN 10A transmits SN Addition Request that is an SN addition request to the SN 10B. The SN Addition Request is an inter-node message for setting up DC. In the SN Addition Request, allowedBC-ListMRDC is included in an information element CG-ConfigInfo. The allowedBC-ListMRDC in step S12 may include band combinations that are limited from the viewpoint of the PCell band supported by the MN 10A.

In subsequent step S13, the SN 10B transmits SN Addition Request Ack to the MN10A as a response to the SN addition request. In the SN Addition Request Ack, information indicating band combinations used with respect to the SCG is included in an information element CG-Config. In subsequent step S14, the MN 10A transmits RRC Reconfiguration for configuring the SCG to the UE 20. In subsequent step S15, the UE 20 transmits RRCReconfiguration-Complete indicating completion of the configuration to the MN 10A. In subsequent step S16, the MN 10A transmits SN Reconfiguration Complete indicating completion of the configuration to the SN 10B.

Figure 7:
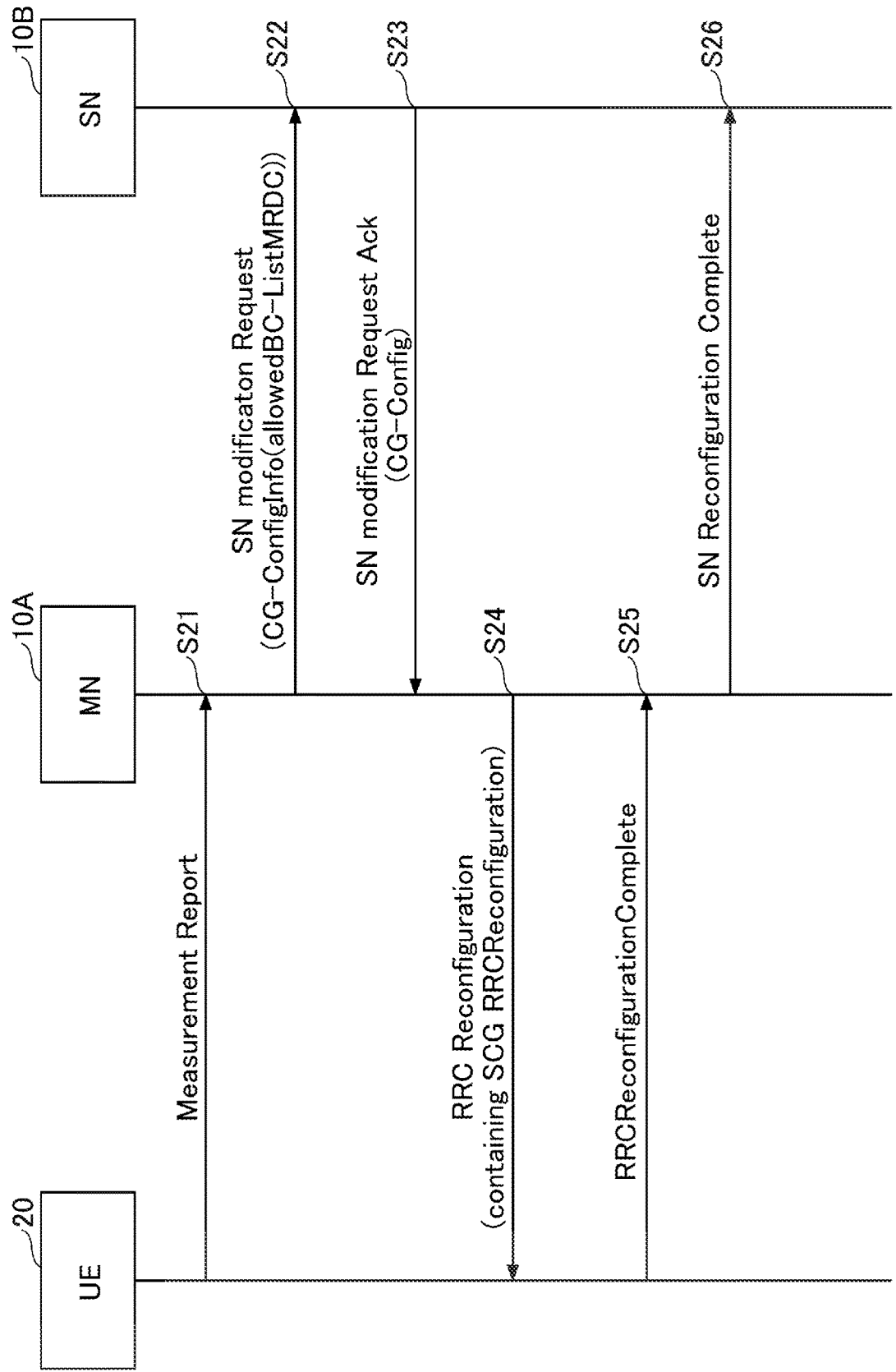
FIG. 7 is a sequence diagram illustrating a second example of configuring band combinations according to the embodiment of the present invention.

FIG. 7 is a sequence diagram illustrating a second example of configuring band combinations according to the embodiment of the present invention. In step S21, the UE 20 transmits MeasurementReport which is a report of a measurement result to the MN 10A. In subsequent step S22, the MN 10A transmits SN modification Request, which is an SN modification request, to the SN 10B. The SN modification Request is a message for modifying the DC that has already been set up. In the SN modification Request, allowedBC-ListMRDC is included in an information element CG-ConfigInfo. The allowedBC-ListMRDC in step S22 may include band combinations that are limited from the viewpoint of the PCell band supported by the MN 10A and/or the SCell band supported by the MN 10A. The allowedBC-ListMRDC in step S22 may include band combinations that are limited from the viewpoint of parameters per supported band, that is, the featureSet. With this limitation, the overhead with respect to inter-node signaling between nodes can be reduced.

In subsequent step S23, the SN 10B transmits SN modification Request Ack to the MN 10A as a response to the SN addition request. In the SN modification Request Ack, information indicating band combinations used with respect to the SCG is included in an information element CG-Config. In subsequent step S24, the MN 10A transmits RRC Reconfiguration for configuring the SCG to the UE 20. In subsequent step S25, the UE 20 transmits RRCReconfigurationComplete indicating completion of the configuration to the MN 10A. In subsequent step S16, the MN 10A transmits SN Reconfiguration Complete indicating completion of the configuration to the SN 10B.

According to the above-described embodiment, the MN indicates, to the SN, all band combinations including the PCell band supported by the MN, so that when the SN is to select a band combination, the number of selectable band combinations increases, and thus it is possible to reduce SCG configuration failure. Further, when changing the SN configuration, the MN can reduce the overhead with respect to inter-node signaling by limiting the band combinations from the viewpoint of PCell and the viewpoint of SCell.

That is, it is possible to reduce the probability of failure in configuring the band combinations at the time of dual connectivity.

(Apparatus Configuration)

Next, functional configuration examples of the base station 10 and the terminal 20 that execute the processes and operations described above will be described. The base station 10 and the terminal 20 include functions for executing the above-described embodiment; each of the base station 10 and the terminal 20 may have only some of the functions of the embodiment.

<Base Station 10>

Figure 8:
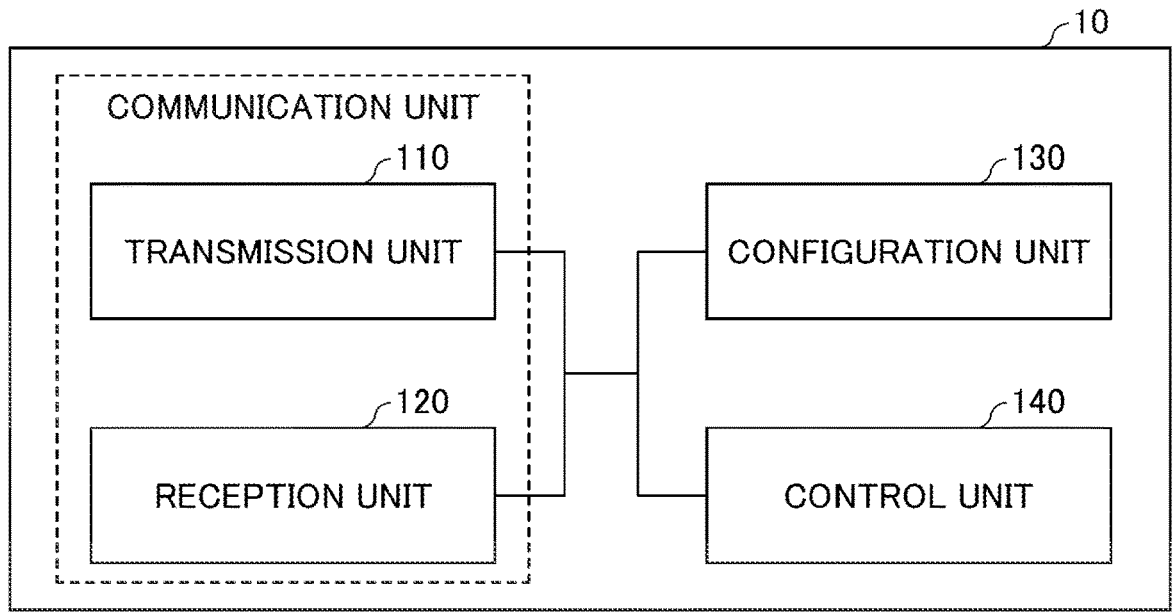
FIG. 8 is a drawing illustrating an example of a functional configuration of a base station 10 according to the embodiment of the present invention.

FIG. 8 is a drawing illustrating an example of a functional configuration of the base station 10. As illustrated in FIG. 8, the base station 10 includes a transmission unit 110, a reception unit 120, a configuration unit 130, and a control unit 140. The functional configuration illustrated in FIG. 8 is merely an example. As long as the operations according to the embodiment of the present invention can be executed, the segmentation into the functional units and the names of the functional units may be changed freely. The transmission unit 110 and the reception unit 120 may be referred to as a communication unit.

The transmission unit 110 has a function of generating a signal to be transmitted to the terminal 20 and wirelessly transmitting the signal. The reception unit 120 includes a function of receiving various signals transmitted from the terminal 20 and acquiring, for example, information of higher layers from the received signals. Also, the transmission unit 110 has a function of transmitting NR-PSS, NR-SSS, NR-PBCH, DL/UL control signals, DL data, and the like to the terminal 20. The transmission unit 110 transmits configuration information and the like described in the embodiment.

The configuration unit 130 stores configuration information that is set in advance and various kinds of configuration information to be transmitted to the terminal in the storage device, and reads the configuration information from a storage device as necessary. The control unit 140 performs, for example, resource allocation, overall control of the base station 10, and the like. It should be noted that a functional unit for signal transmission in the control unit 140 may be included in the transmission unit 110, and a functional unit for signal reception in the control unit 140 may be included in the reception unit 120. The transmission unit 110 and the reception unit 120 may be referred to as a transmitter and a receiver, respectively.

<Terminal 20>

Figure 9:
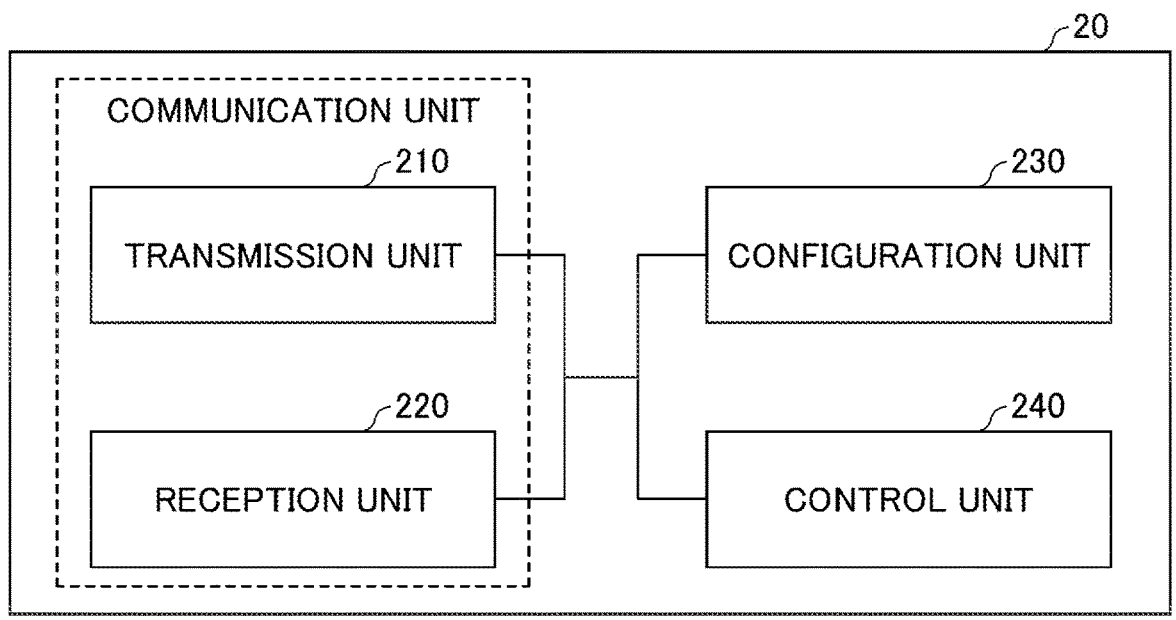
FIG. 9 is a drawing illustrating an example of a functional configuration of a terminal 20 according to the embodiment of the present invention.

FIG. 9 is a drawing illustrating an example of a functional configuration of the terminal 20. As illustrated in FIG. 9, the terminal 20 includes a transmission unit 210, a reception unit 220, a configuration unit 230, and a control unit 240. The functional configuration illustrated in FIG. 9 is merely an example. As long as the operations according to the embodiment of the present invention can be executed, segmentation into the functional units and the names of the functional units may be changed freely. The transmission unit 210 and the reception unit 220 may be referred to as a communication unit.

The transmission unit 210 generates a transmission signal from transmission data and wirelessly transmits a transmission signal. The reception unit 220 wirelessly receives various signals and acquires signals of higher layers from the physical layers of the received signals. Further, the transmission unit 210 transmits HARQ-ACK, and the reception unit 220 receives the configuration information and the like described in the embodiment.

The configuration unit 230 stores various types of configuration information received from the base station by the reception unit 220 in a storage device, and reads the configuration information from the storage device as necessary. The configuration unit 230 also stores configuration information that is set in advance. The control unit 240 performs overall control of the terminal 20. It should be noted that a functional unit for signal transmission in the control unit 240 may be included in the transmission unit 210, and a functional unit for signal reception in the control unit 240 may be included in the reception unit 220. The transmission unit 210 and the reception unit 220 may be referred to as a transmitter and a receiver, respectively.

(Hardware Configuration)

The block diagrams (FIGS. 8 and 9) used in the description of the above-described embodiment depict blocks of the functional units. These functional blocks (configuration units) are each implemented by a combination of at least one of hardware or software. In addition, a specific method of implementing the functional blocks is not particularly limited. That is, each functional block may be implemented by using one physically or logically coupled device, or may be implemented by directly or indirectly (for example, using a wire, a wireless way, or the like) coupled two or more physically or logically separated plurality of devices. The functional blocks may be implemented by combining software with the above-mentioned one device or plurality of devices.

Each function may be, but are not limited to, determining, deciding, judging, calculating, computing, processing, deriving, investigating, searching, ascertaining, receiving, transmitting, outputting, accessing, resolving, selecting, choosing, establishing, comparing, assuming, expecting, deeming, broadcasting, notifying, communicating, forwarding, configuring, reconfiguring, allocating, mapping, assigning, or the like. For example, a functional block that has a function of transmission is referred to as a transmitting unit or a transmitter. In either case, as described above, the specific implementation method is not particularly limited.

Figure 10:
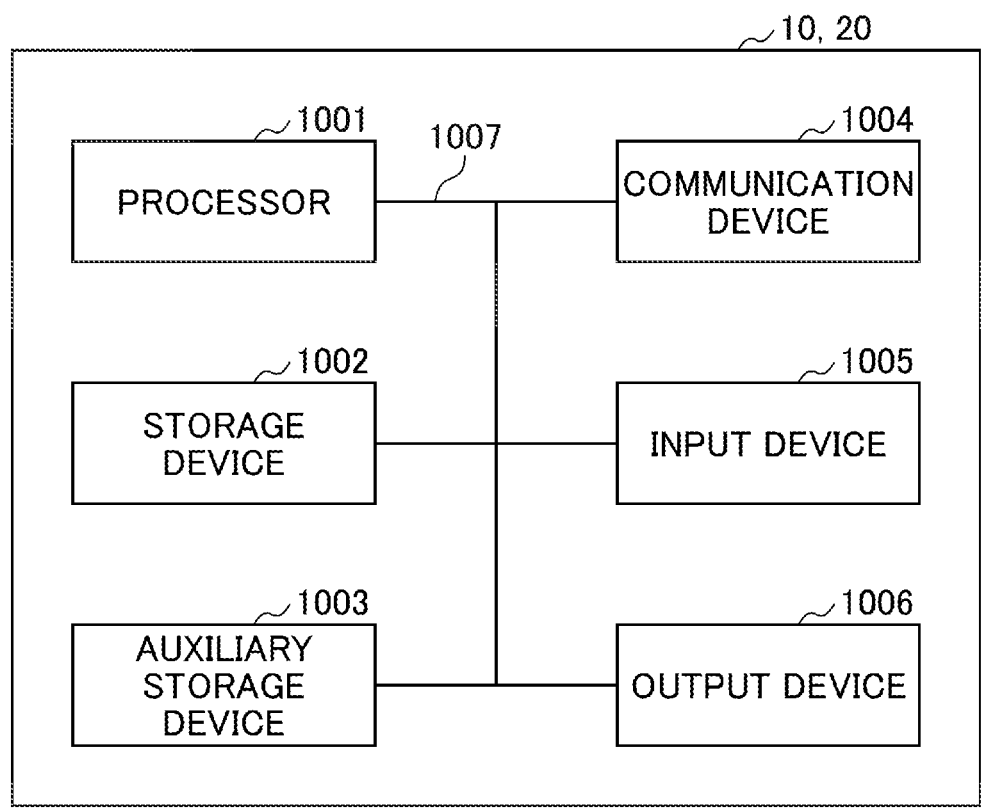
FIG. 10 is a drawing illustrating an example of a hardware configuration of the base station 10 or the terminal 20 according to the embodiment of the present invention.

For example, the base station 10, the terminal 20, and the like according to the embodiment of the present disclosure may function as computers that perform processing of the wireless communication methods according to the present disclosure. FIG. 10 is a drawing illustrating an example of a hardware configuration of each of the base station 10 and the terminal 20 according to the embodiment of the present disclosure. The base station 10 and the terminal 20 described above may be physically configured as computer apparatuses each including a processor 1001, a storage device 1002, an auxiliary storage device 1003, a communication device 1004, an input device 1005, an output device 1006, a bus 1007, and the like.

In the following description, the term "apparatus" can be read as a circuit, a device, a unit, or the like. The hardware configurations of the base station and the terminal 20 may be configured to each include one or more of the devices illustrated in the figure, or may be configured not to include some of the devices.

Each function in the base station 10 and the terminal 20 is implemented by causing hardware such as the processor 1001 and the storage device 1002 to read predetermined software (program), causing the processor 1001 to perform operations to control communication by the communication device 1004 or to control at least one of reading and writing of data with respect to the storage device 1002 and the auxiliary storage device 1003.

The processor 1001 operates, for example, an operating system to control the entire computer. The processor 1001 may be configured as a central processing unit (CPU) including an interface with respect to a peripheral device, a control device, an arithmetic and logic device, a register, and the like. For example, the above-described control unit 140, control unit 240, and the like may be implemented by the processor 1001.

In addition, the processor 1001 reads out a program (program code), a software module, data, or the like from at least one of the auxiliary storage device 1003 or the communication device 1004 to the storage device 1002, and executes various processes in accordance with the program, the software module, the data, or the like. As the program, a program that causes the computer to execute at least some of the operations described with regard to the above-described embodiment is used. For example, the control unit 140 of the base station 10 illustrated in FIG. 8 may be implemented by a control program stored in its storage device 1002 and executed by its processor 1001. In addition, for example, the control unit 240 of the terminal 20 illustrated in FIG. 9 may be implemented by a control program stored in its storage device 1002 and executed by its processor 1001. Although it has been described that the above-described various processes are executed by each single processor 1001, the processes may be executed by two or more processors 1001 simultaneously or sequentially. The processor(s) 1001 may be implemented by one or more chips. The program may be transmitted from a network via an electric communication line.

The storage device 1002 is a computer-readable recording medium, and may include at least one of a read-only memory (ROM), an erasable programmable ROM (EPROM), an electrically erasable programmable ROM (EEPROM), a random access memory (RAM), or the like.

The storage device 1002 may be referred to as a register, a cache, a main memory (main storage device), or the like. The storage device 1002 can store programs (program codes), software modules, and the like that are executable to implement the communication method according to the embodiment of the present disclosure.

The auxiliary storage device 1003 is a computer-readable recording medium, and may include at least one of an optical disk such as a compact disc ROM (CD-ROM), a hard disk drive, a flexible disk, a magneto-optical disc (for example, a compact disc, a digital versatile disc, or a Blu-ray (registered trademark) disc, a smart card, a flash memory (for example, a card, a stick, or a key drive), a floppy (registered trademark) disk, a magnetic strip, or the like. The aforementioned storage medium may be, for example, a database, a server, or any other appropriate medium including at least one of the storage device 1002 or the auxiliary storage device 1003.

The communication device 1004 is hardware (transmission and reception device) for performing communication between the computers via at least one of a wired network or a wireless network, and is also referred to as a network device, a network controller, a network card, a communication module, or the like, for example. The communication device 1004 may be configured to include a high-frequency switch, a duplexer, a filter, a frequency synthesizer, and/or the like in order to implement, for example, at least one of frequency division duplex (FDD) or time division duplex (TDD). For example, a transmitting and receiving antenna, an amplifying unit, a transmitting and receiving unit, a transmission path interface, and the like may be implemented by the communication device 1004. The transmission and receiving unit may be implemented in such a way that the transmission unit and the reception unit are physically or logically separated from each other.

The input device 1005 is an input device (for example, a keyboard, a mouse, a microphone, a switch, a button, a sensor, and/or the like) that receives input from the outside. The output device 1006 is an output device (for example, a display, a speaker, a LED lamp, and/or the like) that performs output to the outside. The input device 1005 and the output device 1006 may be integrated with each other (for example, into a touch panel).

The processor 1001, the storage device 1002, and the like are connected by a bus 1007 for communicating information. The bus 1007 may be configured using a single bus, or may be configured using a different bus for each device.

The base station 10 and the terminal 20 may be configured to each include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented using at least one of these sets of hardware.

Summary of Embodiment

As described above, according to the embodiment of the present invention, there is provided a base station including: a reception unit configured to receive, from a terminal, information indicating band combinations supported by the terminal; a control unit configured to generate first information indicating all band combinations including a supported band of a primary cell among the band combinations supported by the terminal; and a transmission unit configured to transmit the first information to a secondary node. The reception unit is configured to receive, from the secondary node, second information indicating a band combination used by the secondary mode among the all band combinations; and the transmission unit is configured to transmit the second information to the terminal.

According to the above configuration, the MN indicates, to the SN, all the band combinations including the PCell band supported by the MN, so that, when the SN is to select a band combination, the number of selectable band combinations increases, and thus, it is possible to reduce SCG configuration failure. That is, it is possible to reduce the probability of failure in configuring band combinations at the time of dual connectivity.

When generating the first information, the control unit need not limit the band combinations based on a supported band of a secondary cell. According to this configuration, the MN indicates, to the SN, all band combinations including the PCell band supported by the MN without applying another limitation, and, therefore, when the SN is to select a band combination, the number of selectable band combinations increases, so that it is possible to reduce SCG configuration failure.

When generating the first information, the control unit need not limit the band combinations based on a parameter of each supported band. According to this configuration, the MN indicates, to the SN all band combinations including the PCell band supported by the MN without applying another limitation, and, when the SN is to select a band combination, the number of selectable band combinations increases, so that it is possible to reduce SCG configuration failure.

The control unit may generate the first information indicating all band combinations including the supported band of the primary cell among the band combinations supported by the terminal only when setting up dual connectivity. According to this configuration, the MN indicates, to the SN, all band combinations including the PCell band supported by the MN when setting up DC, and, when the SN is to select a band combination, the number of selectable band combinations increases, so that it is possible to reduce SCG configuration failure.

The control unit may limit the band combinations based on a supported band of a secondary cell when generating the first information, only when changing dual connectivity that has already been set up. With this configuration, when the MN is to modify the SN configuration, the MN can reduce signaling overhead by limiting the band combinations from a viewpoint of PCell and a viewpoint of SCell.

According to the embodiment of the present invention, there is provided a communication method performed by a base station, the communication method including: receiving information indicating band combinations supported by a terminal from the terminal; generating first information indicating all band combinations including a supported band of a primary cell among the band combinations supported by the terminal; transmitting the first information to a secondary node; receiving second information indicating a band combination used by the secondary node among all the band combinations from the secondary node; and transmitting the second information to the terminal.

According to the above configuration, the MN indicates, to the SN, all band combinations including the PCell band supported by the MN, so that, when the SN is to select a band combination, the number of selectable band combinations increases, and thus, it is possible to reduce SCG configuration failure. That is, at the time of dual connectivity, it is possible to reduce the probability of failure in configuring band combinations.

Supplementary Explanation of Embodiment

Although the embodiment of the present invention has been described above, the disclosed invention is not limited to such an embodiment, and those skilled in the art will understand various variations, modifications, alterations, substitutions, and the like. Although the present invention has been described using specific numerical examples in order to facilitate understanding of the present invention, these numerical values are merely examples and any other appropriate values may be used unless otherwise specified. Segmentation into items in the above description is not essential to the present invention. Contents described in two or more items may be used in combination as necessary, and contents described in one item may be applied to contents described in another item (as long as there occurs no contradiction). The boundaries of the functional units or the processing units in the functional block diagrams do not necessarily correspond to the boundaries of the physical components. The operations of a plurality of functional units may be physically performed by one component, or the operation of one functional unit may be physically performed by a plurality of components. With regard to the processing procedures described in the embodiment, the sequences of processes may be changed as long as there occur no contradiction. For convenience of explaining the processing, the base station 10 and the terminal 20 have been described using functional block diagrams, but such apparatuses may be implemented by hardware, software, or a combination thereof. Software executed by the processor included in the base station 10 according to the embodiment of the present invention and software executed by the processor included in the terminal 20 according to the embodiment of the present invention may be stored in any appropriate storage media such as random access memories (RAM), flash memories, read-only memories (ROM), EPROMs, EEPROMs, registers, hard disks (HDDs), removable disks, CD-ROMs, databases, servers, or the like.

The specific method of each indication of information is not limited to those of the respective modes and embodiments described in the present disclosure, and the indication may be implemented in other methods. For example, the indication of information may be performed by physical layer signaling (for example, downlink control information (DCI) and/or uplink control information (UCI)), higher layer signaling (for example, radio resource control (RRC) signaling, medium access control (MAC) signaling, broadcast information (a master information block (MIB) or a system information block (SIB)), another signal, or a combination thereof. RRC signaling may be referred to as an RRC message, and may be, for example, an RRC connection setup message, an RRC connection reconfiguration message, or the like.

The respective modes and embodiments described in the present disclosure may be applied to at least one of systems using long term evolution (LTE), LTE-Advanced (LTE-A), SUPER 3G, IMT-Advanced, a 4th generation mobile communication system (4G), a 5th generation mobile communication system (5G), future radio access (FRA), new radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), another system employing an appropriate system, or a next-generation system extended based thereon. In addition, a combination of a plurality of systems (for example, a combination of 5G and at least one of LTE or LTE-A) may be used.

The sequences of processing procedures, sequences, flowcharts, and the like of the respective modes and embodiments described in the present specification may be changed as long as there occurs no contradiction. For example, the methods described in the present disclosure use examples of sequences to present the elements of the various steps and are not limited to the specific sequences presented herein.

The specific operations described in the present specification as being performed by the base station 10 may be performed by an upper node of the base station 10 in some cases. In a network including one or more network nodes including the base station 10, it is apparent that various operations performed for communication with the terminal 20 may be performed by at least one of the base station 10 or another network node (for example, but not limited to, an MME, an S-GW, or the like) other than the base station 10. Although a case where there is one network node other than the base station 10 has been exemplified above, the other network node may be a combination of a plurality of other network nodes (for example, an MME and an S-GW).

Information, a signal, or the like described in the present disclosure may be output from a higher layer (or a lower layer) to a lower layer (or a higher layer). The information, the signal, or the like described in the present disclosure may be input or output via a plurality of network nodes.

Input or output information or the like may be stored in a specific location (for example, a memory) or may be managed using a management table. The input or output information or the like may be overwritten, updated, or appended by other information. The output information or the like may be deleted. The input information or the like may be transmitted to another apparatus.

A determination in the present disclosure may be performed with a value (0 or 1) represented by one bit, may be performed with a Boolean value (true or false), or may be performed through comparison of numerical values (for example, comparison with a predetermined value).

Software shall be interpreted broadly to mean instructions, instruction set, code, code segment, program code, program, subprogram, software module, application, software application, software package, routine, subroutine, object, executable file, thread of execution, procedure, function, or the like, whether it is referred to as software, firmware, middleware, microcode, hardware description language, or another name.

Software, instructions, information, and the like may be transmitted or received over a transmission medium. For example, if the software is transmitted from a website, server, or other remote source using at least one of wired technology (coaxial cable, optical fiber cable, twisted pair, digital subscriber line (DSL), etc.) or wireless technology (infrared, microwave, etc.), the at least one of the wired technology or the wireless technology is included in the definitions of the transmission medium.

Information, signals, and the like described in the present disclosure may be expressed using any of a variety of different technologies. For example, data, instructions, commands, information, signals, bits, symbols, chips, and the like, a reference to which may be made throughout the above description may be expressed by voltages, currents, electromagnetic waves, magnetic fields or particles, optical fields or particles, or any combinations thereof.

It should be noted that the terms described in the present disclosure and terms necessary for understanding the present disclosure may be replaced with other terms having the same or similar meanings. For example, at least one of a channel or a symbol may be a signal (signaling). The signal may be a message. Also, a component carrier (CC) may be referred to as a carrier frequency, a cell, a frequency carrier, or the like.

The terms "system" and "network" used in the present disclosure are used interchangeably.

The information, the parameters, and the like described in the present disclosure may be expressed by using absolute values, may be expressed by using relative values from predetermined values, or may be expressed by using other corresponding information. For example, a radio resource may be identified by an index.

The names used for the above-mentioned parameters are in no way limiting. Furthermore, equations and the like that use these parameters may differ from those explicitly disclosed in the present disclosure. Various channels (e.g., PUCCH, PDCCH, etc.) and information elements may be identified by any other suitable names, and thus the various names assigned to these various channels and information elements are in no way limiting.

In the present disclosure, terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier" and the like may be used interchangeably. A base station may also be referred to with a term such as a macro cell, a small cell, a femto cell, a pico cell, etc.

The base station can accommodate one or more (e.g., three) cells. When the base station accommodates multiple cells, the entire coverage area of the base station may be divided into multiple smaller areas, and each smaller area may also provide a communication service by a base station subsystem (for example, an indoor small base station (remote radio head (RRH)). The term "cell" or "sector" indicates part or all of the coverage area of at least one of the base station or the base station subsystem providing communication services in this coverage.

In the present disclosure, the terms "mobile station (MS)," "user terminal," "user equipment (UE)," "terminal," and the like may be used interchangeably.

The mobile station may also be referred to by the persons skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or another suitable term.

At least one of the base station or the mobile station may be referred to as a transmission device, a reception device, a communication device, or the like. Note that at least one of the base station or the mobile station may be a device mounted on a mobile body, may be a mobile body itself, or the like. The mobile body may be a vehicle (for example, a car, an airplane, or the like), a moving body that moves without an operator (for example, a drone, an automatic driving vehicle, or the like), or a robot (manned or unmanned). At least one of the base station or the mobile station may be a device that does not necessarily move during a communication operation. For example, at least one of the base station or the mobile station may be configured to communicate with an internet of things (IoT) device such as a sensor.

The base station in the present disclosure may be read as a user terminal. For example, each mode or the embodiment of the present disclosure may be applied to a configuration in which communication between the base station and the user terminal is replaced with communication between a plurality of terminals 20 (which type of communication may be referred to as D2D (Device-to-Device), V2X (Vehicle-to-Everything), or the like, for example). In this case, one of the terminals 20 may have the functions of the base station 10 described above. The terms such as "up" and "down" may be replaced with terms (for example, "side") suitable to terminal-to-terminal communication. For example, each of an uplink channel, a downlink channel, and the like may be read as a side channel.

Similarly, the user terminal in the present disclosure may be read as a base station. In this case, the base station may be configured to have the functions of the above-described user terminal.

The term "determining" used in the present disclosure may mean a wide variety of actions. "Determining" may mean, for example, regarding that it has been "determined" that judging, calculating, computing, processing, deriving, investigating, looking up, search, inquiry (e.g., searching in a table, a database, or another data structure), inquiring, or ascertaining has been performed. Also, "determining" may mean regarding that it has been "determined that receiving (e.g., receiving information), transmitting (e.g., transmitting information), inputting, outputting, accessing (e.g., accessing data in a memory) has been performed. In addition, "determining" may mean regarding that it has been "determined" that resolving, selecting, choosing, establishing, comparing, or the like has been performed. That is, "determining" may mean regarding that some action has been "determined". In addition, "determining" may be replaced with "assuming", "expecting", "considering", or the like.

The terms "connected" and "coupled" or any variation thereof mean any connection or coupling, either direct or indirect, between two or more elements, and may mean presence of one or more intermediate elements between the two elements that are "connected" or "coupled" to each other. Coupling or connecting between elements may be coupling or connecting between elements physically, logically, or a combination thereof. For example, "connecting" may be read as "accessing". In the present disclosure, when either one of these terms is used, two elements may be considered as being "connected" or "coupled" to each other using one or more wires, cables, and/or printed electrical connections, as well as using any one of non-limiting and non-inclusive examples, such as electromagnetic energy having wavelengths in the radio frequency range, microwave range, or optical (either of both visible and invisible) range.

A reference signal may be abbreviated as a RS, and may be referred to as a pilot depending on an applied standard.

The words "based on" used in the present disclosure do not mean "based only on" unless expressly specified otherwise. In other words, the words "based on" mean either one of both "based only on" and "based at least on".

Any reference to an element using a modifying word such as "first," "second," or the like used in the present disclosure does not generally limit the quantities or sequence of those elements. These modifying words may be used in the present disclosure as a convenient method of distinguishing between two or more elements. Thus, a reference to first and second elements does not mean that only the two elements may be employed or that the first element must precede the second element in some manner.

"Means" in the configuration of each apparatus described above may be replaced with "unit", "circuit", "device", or the like.

Where "include", "including" and variations thereof are used in the present disclosure, these terms are intended to be inclusive in a manner similar to the term "comprising." Furthermore, the term "or" used in the present disclosure is not intended to mean "exclusive OR".

A radio frame may include one or more frames with respect to time domain. With respect to time domain, each frame of one or more frames may be referred to as a subframe. A subframe may further include one or more slots with respect to time domain. A subframe may have a fixed length of time (e.g., 1 ms) that does not depend on the numerology.

The numerology may be a communication parameter applied to at least one of transmission or reception of a certain signal or channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering process performed by a transmitter-receiver with respect to frequency domain, a specific windowing process performed by a transmitter-receiver with respect to time domain, and the like.

A slot may include one or more symbols (orthogonal frequency division multiplexing (OFDM) symbols, single carrier frequency division multiple access (SC-FDMA) symbols, or the like) with respect to time domain. A slot may be a time unit based on the numerology.

A slot may include a plurality of minislots. Each minislot may include one or more symbols with respect to time domain. A minislot may be referred to as a subslot. A minislot may include a smaller number of symbols than a slot. A PDSCH (or PUSCH) transmitted in time unit larger than a minislot may be referred to as a PDSCH (or PUSCH) mapping type A. A PDSCH (or PUSCH) transmitted using a minislot may be referred to as a PDSCH (or PUSCH) mapping type B.

Each of a radio frame, a subframe, a slot, a minislot, and a symbol means a time unit for transmitting a signal. A radio frame, a subframe, a slot, a minislot, and a symbol may be respectively referred to as names different from those stated above.

For example, one subframe may be referred to as a transmission time interval (TTI), a plurality of consecutive subframes may be referred to as a TTI, or one slot or one minislot may be referred to as a TTI. That is, at least one of a subframe or a TTI may be a subframe (1 ms) in the existing LTE, may have a period shorter than 1 ms (for example, 1 to 13 symbols), or may have a period longer than 1 ms. Note that a unit for expressing a TTI may be referred to as a slot, a minislot, or the like instead of a subframe.

A TTI means, for example, a minimum time unit with respect to scheduling in wireless communication. For example, in an LTE system, a base station performs scheduling for allocating radio resources (a frequency bandwidth, transmission power, and the like that can be used by each terminal 20) to each terminal 20 in units of TTIs. Note that the definition of TTI is not limited to this.

A TTI may be a transmission time unit for a channel-coded data packet (transport block), a code block, a code word, or the like, or may be a processing unit of scheduling, link adaptation, or the like. When a TTI is given, a time interval (for example, the number of symbols) to which a transport block, a code block, a code word, or the like is actually mapped may be shorter than the TTI.

When one slot or one minislot is referred to as a TTI, one or more TTIs (i.e., one or more slots or one or more minislots) may be a minimum time unit of scheduling. The number of slots (the number of minislots) included in the minimum time unit of scheduling may be controlled.

A TTI having a time length of 1 ms may be referred to as a normal TTI (a TTI in LTE Rel. 8-12), a long TTI, a normal subframe, a normal subframe, a long subframe, a slot, or the like. A TTI that is shorter than a normal TTI may be referred to as a shortened TTI, a short TTI, a partial or fractional TTI, a shortened subframe, a short subframe, a minislot, a subslot, a slot, etc.

Note that a long TTI (for example, a normal TTI, a subframe, or the like) may be read as a TTI having a time length exceeding 1 ms, and a short TTI (for example, a shortened TTI or the like) may be read as a TTI having a TTI length less than the TTI length of a long TTI and equal to or greater than 1 ms.

A resource block (RB) is a resource allocation unit with respect to time domain and frequency domain, and may include one or more contiguous subcarriers with respect to frequency domain. The number of subcarriers included in each RB may be the same regardless of the numerology, for example, 12. The number of subcarriers included in an RB may be determined based on the numerology.

An RB with respect to time domain may include one or more symbols, and may have a length of one slot, one minislot, one subframe, or a one TTI. Each of one TTI and one subframe may include one or a plurality of resource blocks.

Note that one or a plurality of RBs may be referred to as a physical resource block (PRB), a subcarrier group (SCG), a resource element group (REG), a PRB pair, an RB pair, or the like.

A resource block may include one or a plurality of resource elements (REs). For example, one RE may have a radio resource region of one subcarrier and one symbol.

A bandwidth part (BWP) (which may also be referred to as a partial bandwidth, etc.) may mean a subset of contiguous common resource blocks (RBs) for the certain numerology in a certain carrier. The common RB may be identified by an RB index with respect to a common reference point of the carrier. A PRB may be defined using a certain BWP and may be numbered in the BWP.

A BWP may mean a BWP for UL (UL BWP) and may mean a BWP for DL (DL BWP). For the terminal 20, one or more BWPs may be configured for one carrier.

At least one of configured BWPs may be active and the terminal 20 need not be assumed to transmit and receive certain signals/channels outside the active BWP. Each of "cell", "carrier", and the like in the present disclosure may be read as "BWP".

The above-described structures of the radio frame, the subframe, the slot, the minislot, and the symbol are merely examples. For example, configurations such as the number of subframes included in a radio frame, the number of slots per subframe or radio frame, the number of minislots included in a slot, the number of symbols and RBs included in a slot or minislot, the number of subcarriers included in an RB, the number of symbols in a TTI, a symbol length, a cyclic prefix (CP) length, and the like can be changed in various ways.

In the present disclosure, for example, when articles such as a, an, and the in English are added by language translation, each of nouns following these articles may be of a plural form in the present disclosure.

In the present disclosure, the expression that "A and B are different" may mean "A and B are different from each other". It should be noted that the expression that "A and B are different" may also mean that "A and B are each different from C". Each of the term "separating", "coupling", and the like may also be interpreted in the same way as the term "different".

The respective modes or embodiments described in the present disclosure may be used alone, may be used in combination, or may be switched therebetween depending on each particular application. Indication of certain information (for example, indication that "it is X") is not limited to being performed explicitly, and may be performed implicitly (for example, by not performing indication of certain information).

Although the present disclosure has been described in detail above, it is clear to those skilled in the art that the present disclosure is not limited to the embodiments described in the present disclosure. The present disclosure can be implemented in a mode having been modified or changed without departing from the scope of the present disclosure defined by the description of the claims. Accordingly, the description of the present disclosure is for illustrative purposes and is not meant to be in any way limiting to the present disclosure.

DESCRIPTION OF SYMBOLS

10 Base station
110 Transmission unit
120 Reception unit
130 Configuration unit
140 Control unit
20 Terminal
210 Transmission unit
220 Reception unit
230 Configuration unit
240 Control unit
30 Core network
1001 Processor
1002 Storage device
1003 Auxiliary storage device
1004 Communication device
1005 Input device
1006 Output device

The invention claimed is:

1. A base station that is a first base station that performs dual connectivity with a second base station, the base station comprising:
　a control unit configured to determine a candidate list of band combinations used for the dual connectivity based on bands of a primary cell of the first base station;
　a transmission unit configured to transmit the candidate list to the second base station; and
　a reception unit configured to receive, from the second base station, information indicating a band combination selected by the second base station from the candidate list,
　wherein the transmission unit transmits a message for performing a cell configuration of the second base station to a terminal, and the reception unit receives a response to the message from the terminal.

2. A communication system comprising; a first base station; a second base station; and a terminal, that perform dual connectivity, wherein
　the first base station includes:
　　a control unit configured to determine a candidate list of band combinations used for the dual connectivity based on bands of a primary cell of the first base station
　　a transmission unit configured to transmit the candidate list to the second base station; and
　　a reception unit configured to receive, from the second base station, information indicating a band combination selected by the second base station from the candidate list, wherein
　　the transmission unit transmits a message for performing a cell configuration of the second base station to the terminal, and
　　the reception unit receives a response to the message from the terminal,
　the second base station includes:
　　a reception unit configured to receive the candidate list from the first base station; and
　　a transmission unit configured to transmit, to the first base station, information indicating a band combination selected by the second base station from the candidate list, and
　the terminal includes:
　　a reception unit configured to receive, from the first base station, a message for performing cell configuration of the second base station; and
　　a transmission unit configured to transmit a response to the message to the first base station.

3. A communication method performed by a first base station that performs dual connectivity with a second base station, the communication method comprising:
　determining a candidate list of band combinations used for the dual connectivity based on bands of a primary cell of the first base station;
　transmitting the candidate list to the second base station;
　receiving, from the second base station, information indicating a band combination selected by the second base station from the candidate list;
　transmitting a message for performing a cell configuration of the second base station to a terminal; and
　receiving a response to the message from the terminal.

* * * * *